(12) United States Patent
Iftime et al.

(10) Patent No.: US 12,115,701 B2
(45) Date of Patent: Oct. 15, 2024

(54) RECYCLABLE ENHANCED PERFORMANCE CARBON FIBER REINFORCED POLYMERS

(71) Applicant: PALO ALTO RESEARCH CENTER INCORPORATED, Palo Alto, CA (US)

(72) Inventors: Gabriel Iftime, Newark, CA (US); Junhua Wei, Mountain View, CA (US); Jerome Unidad, San Francisco, CA (US); Rahul Pandey, San Jose, CA (US); Sean Roark Garner, San Francisco, CA (US)

(73) Assignee: Xerox Corporation, Norwallk, CT (US)

( * ) Notice: Subject to any disclaimer, the term of this patent is extended or adjusted under 35 U.S.C. 154(b) by 1024 days.

(21) Appl. No.: 17/080,998

(22) Filed: Oct. 27, 2020

(65) Prior Publication Data

US 2021/0260793 A1 Aug. 26, 2021

Related U.S. Application Data

(60) Provisional application No. 62/979,513, filed on Feb. 21, 2020.

(51) Int. Cl.
*B29B 17/04* (2006.01)
*B29B 17/00* (2006.01)
*C08L 63/00* (2006.01)

(52) U.S. Cl.
CPC ...... *B29B 17/0412* (2013.01); *B29B 17/0036* (2013.01); *C08L 63/00* (2013.01); *B29B 2017/0484* (2013.01); *C08L 2207/20* (2013.01)

(58) Field of Classification Search
CPC ............ B29B 17/0412; B29B 17/0036; B29B 2017/0484; C08L 63/00; C08L 2207/20
(Continued)

(56) References Cited

U.S. PATENT DOCUMENTS 9,718,914 B2 8/2017 Iftime et al.
10,138,317 B2 * 11/2018 Iftime ...................... C08K 9/08
(Continued)

FOREIGN PATENT DOCUMENTS

DE         42 05 119       8/1993
DE   10 2011 115966      4/2013
(Continued)

OTHER PUBLICATIONS

Luo et al. "Fabrication of a three-dimensional reinforcement via grafting epoxy functionalized graphene oxide onto carbon fibers", Materials Letters, 209 (2017), pp. 463-466. (Year: 2017).*
(Continued)

*Primary Examiner* — Michael M. Bernshteyn
(74) *Attorney, Agent, or Firm* — Miller Nash LLP

(57) ABSTRACT

A method of recycling fiber reinforced polymers includes grinding used fiber reinforced polymers material to produce ground particles, functionalizing the ground particles to produce functionalized particles, dispersing the functionalized particles into a base resin, dispensing the resin with functionalized particles into one or more layers of continuous fiber mats, molding the resin with functionalized particles and the continuous fiber mats into a form of a desired part, and curing the form to produce the part. The used fiber reinforced polymer materials may be carbon fiber reinforced polymers or glass fiber reinforced polymer materials.

20 Claims, 2 Drawing Sheets

(58) Field of Classification Search
USPC .......................................................... 521/40
See application file for complete search history.

(56) References Cited

U.S. PATENT DOCUMENTS

| | | | |
|---|---|---|---|
| 2015/0086881 A1 | 3/2015 | Zhamu | |
| 2016/0060535 A1* | 3/2016 | Gehr | C10B 57/02 423/447.8 |
| 2016/0193751 A1* | 7/2016 | Humfeld | C08J 5/249 156/181 |
| 2017/0058070 A1 | 3/2017 | Iftime et al. | |
| 2019/0194417 A1 | 6/2019 | Wei et al. | |

FOREIGN PATENT DOCUMENTS

| | | | | |
|---|---|---|---|---|
| DE | 102011115966 A1 * | 4/2013 | ............ | B29B 17/02 |
| KR | 2018116511 A * | 10/2018 | ............ | B29B 11/16 |
| KR | 20180116511 | 10/2018 | | |
| WO | 03059993 A | 7/2003 | | |

OTHER PUBLICATIONS

Vo Dong et al., Economic and environmental assessment of recovery and disposal pathways for CFRP waste management. Resources, Conservation and Recycling, 133. 63-75 (2018).

Moosburger-Will et al., "Interaction between carbon fibers and polymer sizing: Influence of fiber surface chemistry and sizing reactivity," Applied Surface Science 439 (2018) 305-312.

Kowalczyk, K. and Spychaj, T., Ionic liquids as convenient latent hardeners of epoxy resins, Polimery, 48:11-12, 883-835 (2003).

Wan et al., "Grafting of epoxy chains onto graphene oxide for epoxy composites with improved mechanical and thermal properties," Carbon, 69, 467-480 (2014).

Bao et al., "In situ preparation of functionalized graphene oxide/epoxy nanocomposites with effective reinforcements," J. Materials Chemistry, 21, 13290-13298 (2011).

Li et al., Synthesis and characterization of reinforced acrylate photosensitive resin by 2-hydroxyethyl methacrylate-functionalized graphene nanosheets for 3D printing, J. Materials Science, 53, 1874-1886 (2018).

Luo, Yuancong et al. "Fabrication of a three-dimensional reinforcement via grafting epoxy functionalized graphene oxide into carbon fibers," Materials Letters 209 (2017), pp. 463-466.

Lu, Shaorong et al. "Epoxy nanocomposites filled with thermotropic liquid crystalline epoxy grafted graphene oxide" RCS Advances 3 (2013) pp. 8915-8923.

Wei Xia et al. "Functionalied graphene serving as free radical scavenger and corrosion protection in gamma-irradiated epoxy composites" Carbon 101 (2016), pp. 315-323.

Li et al. "Control of the functionality of graphene oxide for its application in epoxy nanocomposites" Polymer 54 (2013) pp. 6437-6446.

Rafiee et al., Ehhanced Mechanical Properties of Nanocomposites at Low Graphene Content, ACS Nano, 3:12, 3884-3890 (2009).

* cited by examiner

RECYCLABLE ENHANCED PERFORMANCE CARBON FIBER REINFORCED POLYMERS

CROSS REFERENCE TO RELATED APPLICATION

This application claims priority to and the benefit of U.S. Provisional Application No. 62/979,513 filed Feb. 21, 2020, which is incorporated by reference herein in its entirety.

TECHNICAL FIELD

This disclosure relates to fiber reinforced polymers (FRPs), more particularly to recyclable FRPs.

BACKGROUND

Vehicle lightweighting involves building cars and trucks that weigh less as a way to achieve better fuel efficiency and handling. Many governments and car manufacturers worldwide have made it a priority. The main benefit is the improved vehicle fuel economy and the reduction of the greenhouse gases emission. Because of their high specific strength, stiffness and excellent corrosion resistance, carbon fiber reinforced polymers (CFRPs) have the highest potential for weight reduction, by approximately 70%, of vehicle body panels, far superior to alternative lower risk strategies, including aluminum that weighs at least 40% more, and multimaterials that weigh at least 45% more.

However, the cost of CFRPs today when compared with various steels and with aluminum is too high to make this a viable economic approach for the automotive industry. Measuring weight in cars often occurs at the body-in-white (BIW) stage, meaning the stage in which car body components have undergone joining, before painting and before assembling the motor, chassis assemblies and trim. Recent techno-economic analysis indicated that replacing the BIW of an average sedan car with CFRP may reduce its weight by 52%, from 717 lb. to 344 lb. However, this would increase the BIW cost from $1287 to $6546 [A. Mascarin et al., Vehicle Lightweighting: Mass Reduction Spectrum Analysis and Process Cost Modeling (2016)]. This represents an associated increased cost of the mass saving of about $14.00/lb. of mass saved. The target cost of the mass savings is for lower than $5.00/lb. of mass saved, which is offset by the fuel savings enabled by weight reduction over the life of the vehicle. Current CFRPs cannot meet this target.

Low cost requires fast cycle time of less than 3 minutes per part, which is difficult to achieve with today's materials and manufacturing methods. In addition, another difficult task arises with the need for recycling CFRP parts at the end of life to reduce their footprint. Also, in many cases, just achieving the weight and targeted cost reductions with new materials is a necessary but not a sufficient requirement to enable the use of the manufactured parts. For example, the visible part of the car including the hood, roof panel and other panels must meet the class A surface esthetic requirements, an ongoing challenge with CFRP. CFRPs display print-through defects after molding that prevent them from meeting this requirement. The challenge is solved today by high cost post molding processing steps. Another problem is the loss of dimensional stability at the high temperatures required for painting. The same challenges apply to other industries that are using CFRPs, including aerospace, tool manufacturing, sport goods and other specialty goods.

The main barriers to adoption of CFRPs by the automotive industry are the carbon fiber's (CFs) and the part manufacturing costs. Current approaches to reduce the cost of the carbon fibers involving the use of low cost fiber precursor feedstocks have been extensively investigated, but the progress has been relatively slow. The less than $5.00/pound-saved increase of the cost of savings target cannot be realized with the current CFs that still cost approximately $12.5/lb.

The second approach relates to reducing the cost of manufacturing the CFRP parts. The industry leading manufacturing process for CFRP parts is the high-pressure resin transfer molding (HP-RTM). It has a very stringent requirement for low viscosity resins and it is relatively slow. Also, the process requires costly high pressure equipment to pump the resin into carbon fiber fabric. Therefore, the CFRP manufacturing cost is still high at approximately $11/lb.

Another approach uses resin enhanced CFRPs wherein the mechanical properties of the CFRP are increased by the resin without changing the carbon fiber material or processing. Previous attempts revealed mixed results, including CFRP improvement from −10%, a negative effect, to 27%. They were realized with both expensive carbon nanotubes and graphene, which add significant cost to the CFRP materials or with lower cost organic clays, which have a higher density than carbon and also make the CFRPs recycling difficult. In addition, these CFRPs are made with slow curing agents and with low glass transition temperature resins in the range of 120° C., which cannot sustain high temperatures and are prone to defects. This represents an ongoing challenge with CFRPs, which display print-through defects after molding. As is well known in the composites industry, the use of reinforced/filled resins for CFRP manufacturing, such as using nano-filled epoxy as mentioned above, may improve dimensional stability and shrinking. It has the problem of reducing the friction holding the carbon fiber-epoxy interface that normally increases when the epoxy shrinks due to a normal force imposed by the shrinking. Hence, typical reinforced/filled resins may have greater dimensional stability but might then be prone to debonding at high temperatures or high stresses.

To reduce the environmental impact of fiber reinforced polymers (FRPs), which includes fiber reinforced plastics, materials, recycling of waste FRPs is required. This is a very challenging task. Due to the surface chemical and morphology changed throughout the recycle process, the performance (such as mechanical properties) of the recycled continuous carbon fibers is lower than the original carbon fiber, which dramatically impact the performance of the CFRP, and they can be used today only for applications that require dramatically lower performance than the original materials. Until now, all the processes of recycling CFRP is through removal of the organic part, polymer, in CFRP and collecting the inorganic carbon fiber and used. There is no way to directly using the CFRP as a whole for recycling. Approaches to upcycle waste FRPs, especially CFRPs i.e., to use them in applications where the recycled materials offers unique properties, enabling high value and high performance materials are needed.

SUMMARY

A method of recycling fiber reinforced polymers, including grinding used fiber reinforced polymer material to produce ground particles, functionalizing the ground particles to produce functionalized particles, dispersing the functionalized particles into a base resin, dispensing the resin with functionalized particles into one or more layers of continuous fiber mats, molding the resin with functionalized particles and the continuous fiber mats into a form of a desired part, and curing the form to produce the part.

According to aspects illustrated here, there is provided a method of recycling carbon fiber reinforced polymers, including grinding used carbon fiber reinforced polymers material to produce ground particles, functionalizing the ground particles to produce functionalized particles, dispersing the functionalized particles into a base resin, dispensing the resin with functionalized particles into one or more layers of carbon fiber mats, molding the resin with functionalized particles and the carbon fiber mats into a form of a desired part, and curing the form to produce the part.

According to aspects illustrated here, there is provided a method of recycling glass fiber reinforced polymers that includes grinding used glass fiber reinforced polymers material to produce ground particles, functionalizing the ground particles to produce functionalized particles, dispersing the functionalized particles into a base resin, dispensing the resin with functionalized particles into one or more layers of fiber glass mats, molding the resin with functionalized particles and the fiber glass mats into a form of a desired part, and curing the form to produce the part.

DETAILED DESCRIPTION OF THE EMBODIMENTS

Figure 1:
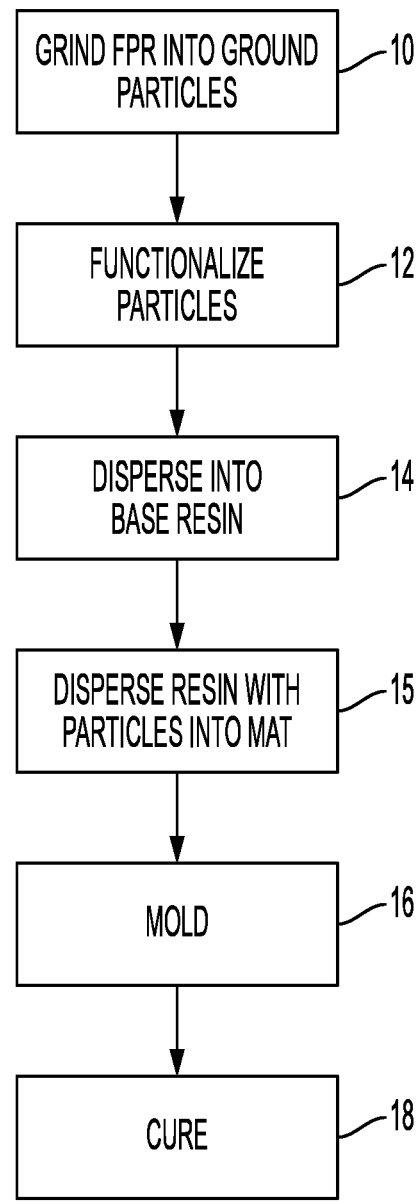
FIG. 1 shows a flowchart of an embodiment of a method of manufacturing parts with recycled carbon fiber reinforced polymer particles.

Embodiments here enable fabrication of a lightweight, paintable CFRP parts with class A surface finish with weight reduced by more than 70% when compared with a steel roof and with an acceptable cost increase, lower than $5.00 per pound-saved, offset by the fuel savings enabled by lightweighting, while enabling recycling of the CFRPs at the end of life. The CFRP parts may also be created from other recycled fiber reinforced polymers (FRPs) that include fiber reinforced plastics.

Embodiments here include a composite resin formulation that incorporates a high glass transition epoxy resin after cure, meaning it has a glass transition temperature of greater than 150° C. The formulation includes functionalized recycled CFRP particles with functional groups that are similar or compatible with the epoxy resin, and that upon curing react with the epoxy resin. This produces a cross-linked structure with a network of chemically linked CFRP particles distributed within the cured resin.

Embodiments include a carbon fiber reinforced polymer structure fabricated with the above composite resin instead of with a commercial resin.

Embodiments include a process for fabrication of CFRP parts by a modified and improved wet compression molding process Embodiments include a process for treating recyclable CFRPs and using them as performance enhancement fillers in the epoxy resin.

PARC has developed chemically linked particles networks composite materials platform, wherein high loading epoxy-compatible dispersible functionalized particles, up to 50%, are chemically bonded to each other by flexible polymer linkers achieving remarkably high mechanical properties, up to 5× higher than the base resin.

A key benefit of using the CFRP particle based resin from these embodiments is enabling full recycling of the CFRP parts at the end of life. CFRP composites incorporating carbon nanotubes, graphene or inorganic particles such as clays would result in inhomogeneous new CFRP composites because their composition would be impossible to control. On the other hand, the composite resin in these embodiments incorporates CFRP particles that have exactly the same key components (carbon fibers+epoxy resin) which match closely the composition of conventional CFRPs. Recycling waste CFRPs made with CFRP particles from these embodiments produce new CFRP particles that enable manufacturing of new CFRP objects with consistent, controllable composition. This is not possible if the reinforcing particles are materials other than CFRPs. The raw recycled CFRP particles are produced by grinding of the CFRP parts. An additional advantage of the recycled particles as resin reinforcement is their very low cost, approximately $0.25/kg). In comparison, graphene and carbon nanotubes which may be more suitable for the purpose of recycling (because they are carbon materials, like the carbon fibers) can cost as much as $1000/kg.

With respect to CFRPs manufactured with resins, conventional wisdom dictates that the mechanical properties of CFRPs (strength, elastic modulus) are determined by the CF alone because resin's properties are orders of magnitude lower, with strength greater than 60 MPa, and modulus less than 3 GPa. The composite resin's mechanical properties are sufficiently high, having an approximate strength of approximately 110 MPa, an elastic modulus up to 10 GPa, and elongation at break up to 2%, enabling the resin to increase the mechanical properties of CFRPs beyond those enabled by carbon fibers (CFs) alone.

The embodiments here enable dimensional stability at high temperature in multiple ways. These include the high glass transition temperature (Tg) epoxy resin base system achieved by high cross linking density, resulting in the cured resin has a significantly lower coefficient of thermal expansion (CTE), minimizing the mismatch with the low CTE carbon fibers. For example, the EPON Resin 164, commercially available from Hexion, has a CTE of only $17\text{-}22\times10^{-6}$ m/(m K), three times lower than conventional RTM resins.

Another enabling aspect lies in the CFRP particle fillers, which further decrease the likelihood for debonding primarily by increasing the modulus of the resin, making it more dimensionally-stable, and further contributing to minimizing the CTE mismatch.

Another enabling aspect lies in the chemically linked particle network: The chemical bonding of the particles through the epoxy resin, which further increases the elastic modulus of the composite, beyond the basic reinforcement effect, and by additional crosslinking, can further prevent debonding at high temperature. For example US Patent Appl. Publication 20190194417, Wei Junhua et al., published Jun. 27, 2019, has shown that materials incorporating chemically bonded particles possess significantly increased modulus and strength when compared with the same non-bonded particles.

The embodiments enable class A surfaces in several ways including reinforced/particle-filled resins are not conventionally used for making class A surfaces. The main issue here in obtaining class A surfaces results from the poor dispersibility of most filler particles in epoxy resins. The composite resin material from these proposed embodiments achieves class A surfaces while at the same time increasing the mechanical properties of the CFRP. The unique and inherent feature of the composite resin from the embodiments is the excellent dispersion of the functionalized CFRP particles that have excellent compatibility with the resin base material. This is unlike other conventional particles that may form large agglomerates that result in undesired roughness.

Another enabler lies in minimizing fiber print-through effects. The main reason for the print-through is the shrinkage of the resin while the carbon fibers do not shrink. The composite resin of the embodiments is an excellent solution to this problem because the high glass transition resins have inherently low free volume achieved by dense crosslinking; and the chemical linking of particles further reinforce the resin matrix and may further reduce volume shrinkage beyond the effect of high transition temperature resins. This is another distinctive feature of our materials, which cannot be achieved with conventional RTM or plain resin systems.

The embodiments here provide unique advantages previously not simultaneously available. These include 25% CFRP weight and ~40% cost reduction of the CFRP objects achieved by decreasing the amount of CFRP per part, enabled by chemically linked particles networks. Another advantage lies in short cycle time of less than 3 minutes enabled by commercial fast curing agents and by wet compression molding (WCM) and in situ impregnating molding process which has the potential to reduce the manufacturing cost from approximately $8/lb. to $5/lb. Another advantage lies in recycling of waste CFRP by grinding to produce new low cost CFRP particles at more than $0.25/lb.

The paintable class A surface results from high glass transition temperatures of greater than 180° C. highly cross linked epoxy resins with low coefficient of thermal expansion and by increased resin elastic modulus. These increase the part's dimensional stability at high temperature and eliminate the resin shrinkage-related print-through problem. The chemical linkages of the carbon fiber with the epoxy-functionalized-recycled CFRP particles network increases the interfacial strength between the enhanced resin and the carbon fiber due to the chemical. This prevents debonding and offsets the loss of friction due the reduced resin shrinkage.

Because CFRPs are composite thermoset materials made of cross-linked polymer structures, they do not melt and as a result, they cannot be simply recycled by methods applied to meltable plastics. Thermoplastic materials can be removed simply by melting and recollection to leave clean carbon fibers that can be used potentially for making new parts. The embodiments here use CFRP particles provided by grinding CFRP such as waste parts at the end of life. Processes for grinding particles are known [Vo Dong et al., Economic and environmental assessment of recovery and disposal pathways for CFRP waste management. Resources, Conservation and Recycling, 133. 63-75 (2018)]. They can provide two types of CFRP particles, either particles containing some of the previous cured epoxy onto their surface, a composite particle, or pure carbon fiber particles, wherein the epoxy has been removed from the surface of the particles.

FIG. 1 shows a flowchart of a method of manufacturing CFRP parts. At 10, one embodiment uses FRP structures or other formed objects to grind them into the ground FRP particles used as starting materials for fabrication of functionalized CFRP particles. These CFRP particles may consist of ground or chopped carbon fiber particles with or without significant residual epoxy attached to them. The particles may have maximum dimensions ranging from 100 nm to 5 mm. The key design rule is that the functionalized CFRP particles possess end-epoxy functional groups. This is required for increasing the compatibility and dispersibility of the particles into the resin. In this way, high concentration of particles into epoxy resin base can be achieved, which is a key requirement for achieving composite resins with increased mechanical properties, reduced shrinkage, etc.

One should note that alternative feedstocks, such as ground or chopped glass fiber composite particles (GFRP), polymer fiber reinforced particles (PFRP), metal, ceramic, such as alumina and titania, and can be functionalized with similar or analogous methods to yield dispersible particles. In these cases, similar gains in mechanical properties, dimensional stability, reduced shrinkage, etc. can be achieved by tuning the particle functionalization, dispersion and concentration in the resulting filled resin. The particles used will be referred to here as FRPs, which encompasses CFRPs.

In these alternative embodiments, the resulting enhanced CFRP can still achieve lightweighting for vehicle applications but may not be as recyclable as those made with recycled CFRP particles. In these embodiments, the resulting FRP may be made recyclable by using FRP particles with the same material as the fiber intended for the final composite part, such as using chopped or ground Kevlar fiber composite particles for fabricating a Kevlar FRP part or using chopped or ground glass fibers or glass fiber, referred to here as fiberglass, composite particles for fabricating a glass FRP part.

Specific methods for functionalization of various types of raw materials particles have been disclosed in U.S. Pat. No. 10,138,317, by Iftime, et. al., and U.S. Pat. No. 9,718,914, Iftime, et. al., both incorporated in their entirety herein.

Additional specific methods for functionalization of carbon based materials have also been disclosed in US Patent Application Publication 20190194417, Wei Junhua et al., and Pub. Jun. 27, 2019. Functionalized CFRP containing pure carbon fiber particles can be manufactured by any method that produces particles terminated with epoxy functional groups, including those described above.

In many cases, the recycled carbon fiber particles may contain some functional groups, remainders from the so-called sizing process during the initial fabrication of the continuous fibers. For the epoxy based sizing material, groups like COR, C=O and COOR are created which have as purpose to facilitate the wetting of the carbon fiber by the epoxy, while covering the surface roughness of the carbon fiber. [J. Moosburger-Will et al./Applied Surface Science 439 (2018) 305-312]. At 12, the process functionalizes the particles. Some particles may contain some of the previous cured epoxy onto their surface, referred to here as a composite particle. In this case, functionalization, meaning attachment of new epoxy terminated materials onto the surface of the particles, can be achieved either by reactions that bond the new groups onto the surface of the carbon materials by one of the methods disclosed above, or onto the surface of the cured epoxy.

Both direct and indirect processes can achieve functionalization onto the surface of cured epoxy can be achieved by both direct and indirect processes. Direct processes involve transformation of other chemical groups present into cured epoxy, into new epoxy groups, by reagents such as m-cpba. Indirect processes involve generating a functional group onto the cured epoxy resin, which is further reacted with new reagents that contain at least of epoxy group, to end up with a reactive functional group onto the surface of the cured epoxy. This generally requires attaching another small molecule. For example, using acidic cleavage of ether to treat the cured epoxy can produce hydroxyl groups.

Further reaction is with an epoxy resin that contain two epoxy groups per molecule. One of the epoxies reacts with the alcohol resulted from the acidic cleavage, to epoxy functionalize the surface, where the second epoxy is available for chemical crosslinking with epoxy from resin base when this particle is used as resin filler.

The size of the particles is controlled by the grinding method, which can include grinding equipment, conventional ball milling, high power planetary ball milling or other methods. Ball media may include stainless steel, alumina, zirconia, yttria zirconia oxide, tungsten carbide and any other media that is harder than the carbon fiber.

The particle size in at least one dimension can be in a range from 10 nm to 10 mm, depending on CFRP grinding experimental process parameters. Generally, higher energy input, longer processing times and smaller milling balls produce CFRP particles of a smaller size.

The degree of functionalization, meaning the amount of incorporated functional organic materials onto the surface of the particles, may range from 0.05% to 60% or even more depending on the functionalization method or functional organic molecule.

Returning to FIG. 1, the process then disperses the functionalized FRP particles into a base resin at 14. The process generally requires dispersion of the functionalized FRP particles into a base resin. High quality dispersion is achieved by any mixing methods, including but not limited to shear mixing, like centrifuge mixing, rheometer mixing, cutting and folding features within screw-barrel type extruders, compressive mixing, flow mixing, other mixing methods used in polymer compounding, etc. or by energy dispersion approaches like sonication dispersion.

After the particles are dispersed into the resin at 14, the resin with particles are dispersed into one or more layers of a continuous fiber mat at 15. The fiber mat may comprise one of continuous carbon fiber, fiberglass, silicon carbide (SiC), aluminum oxide ($Al_2O_3$), and Kevlar fiber (heat-resistant synthetic light-weight fiber). After the dispersion into the one or more layers of the mat, the resin with particles and the mat are molded into the form of a desired part at 16 and then cured at 18.

Dispersion processes may be done within batch, semi-continuous or continuous processing depending on the downstream processing method for making the final CFRP part. The dispersed functionalized particles could already have the epoxy group or groups which could be used to reacted with the resin.

Conventional resins produce cured epoxies with low glass transition temperature (Tg). When heated for example for painting or for sealing onto other parts, the resin softens and as a result the CFRP object loses dimensional stability. High glass transition temperature (Tg) epoxy resins minimize this effect. They generally achieve high glass transition temperatures of greater than 180° C. by high crosslinking density or by having longer or bulkier monomers. The cured resin has a significantly lower coefficient of thermal expansion (CTE), minimizing the mismatch with the low CTE carbon fibers. For example, the EPON Resin 164 has a CTE of only 17-22×10−6 m/(m K), approximately three times lower than conventional RTM resins.

Conventional low Tg epoxies contain two epoxy groups per resin molecule, which produces cured resins with low Tg. High Tg is achieved with resins having more than 2 functional groups per molecule, such as 2.5 to 6 or more which produce dense cross linked structures.

Example of suitable resins with high crosslinking density, meaning greater than 2 epoxy groups per molecule of resin, include epoxy Novolac resins, with a general chemical structure shown below or other multifunctional resins:

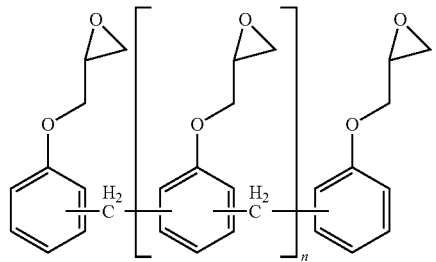

Some of these resins are commercially available, for example at Hexion. For example, Epon resin SU-8 (Tg 195-230; epoxy functionality of 8 epoxy per molecule), Epon resin 1031 (Tg 195-230 deg. C; epoxy functionality 3.5), Epon resin 164 (Tg 200-240 deg. C; epoxy functionality 4.1). Other high Tg resins are available at Masterbond, such as EP13, EP121CL and EP46HT-1 or at DIC corporation, EPICLON HP-4710, Ultra-high Heat-resistant Epoxy Resin that has a Tg of 350° C.

Fast curing agents are necessary to achieve fast cycle time, ideally less than 3 minutes per part during the fabrication of the CFRP objects. They generally cure fast, between 1-3 minutes, at temperatures above 100° C. In general, the usable curing temperature can be in a range from 100° C. to 250° C. Generally, the higher the curing temperature, the further decrease in the curing time and increase in the mechanical properties of the cured resin.

There are two types of curing agents suitable for the purpose of these embodiments. The first type uses rapid curing amino hardeners. They are used in an A plus B system, where the A component is the epoxy resin and the B component is the amine hardener. They are premixed just prior to use and applied immediately. Suitable examples of fast curing amine hardeners include Aradur®3475 and Hardener XB 3458 available at Huntsman, or fast curing agents available at Hexion. The second type of curing agents are the so called latent curing agents, which when mixed with the epoxy base resin including the composite resin from the embodiments, provide stable solutions that do not cure at room temperature. They are used as a one-part resin system. They cure fast when heated at temperatures above 120° C. Generally higher curing temperatures are required with latent curing agents than with amino hardeners. Suitable examples of latent curing agents include ionic liquids such as 1-Ethyl-3-methylimidazolium dicyanamide, 2-Ethyl-4-methylimidazole, Dicyandiamide (DICY). They are often used with accelerators and catalysts such as tertiary amines.

Figures 2A, 2B:
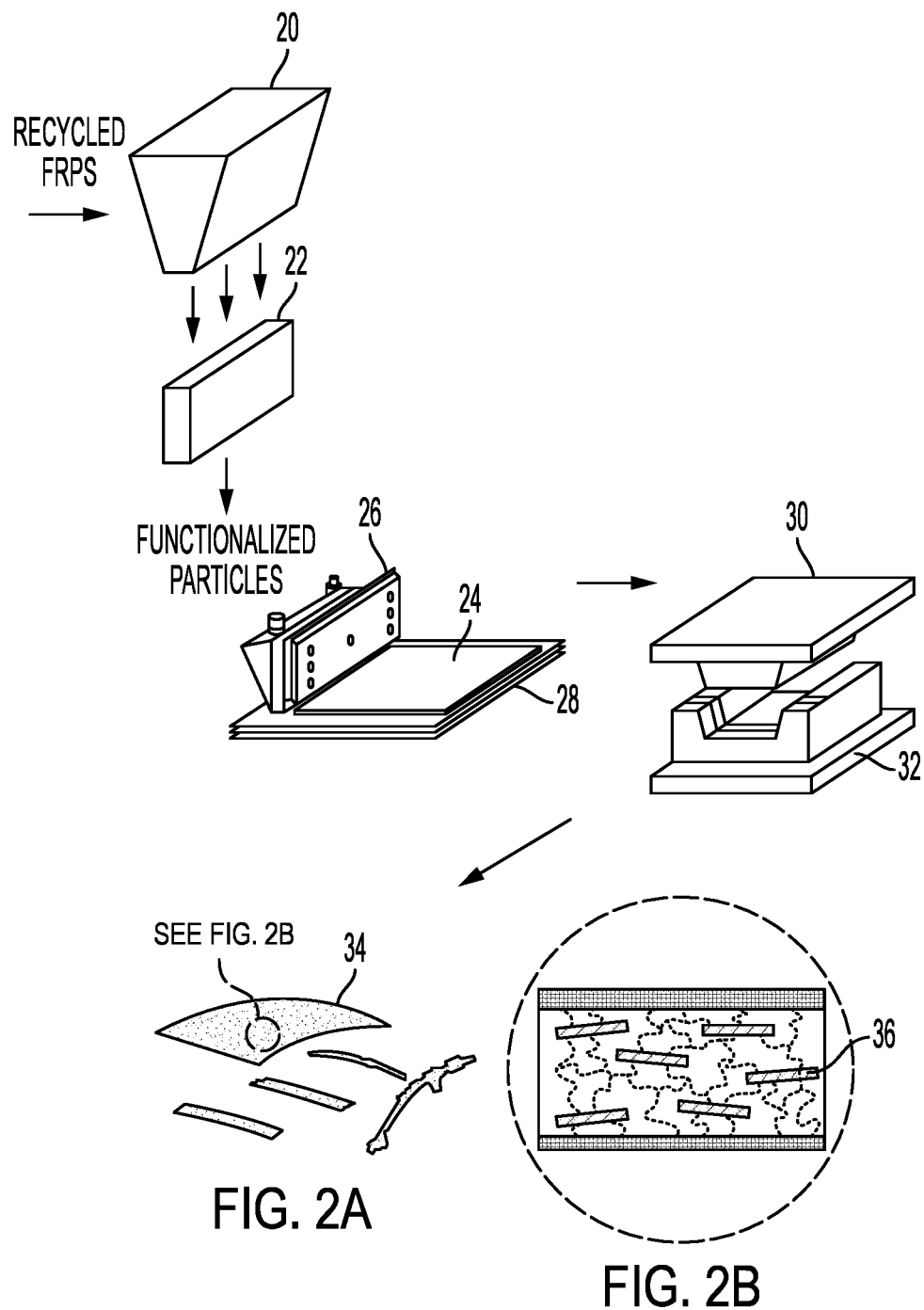
FIGS. 2A and 2B show a process for molding parts using carbon fiber reinforced polymers.

The enhanced resin system from the embodiments is designed to be compatible with common well-known methods for fabricating CFRP parts. These may include any of the following methods among others: wet compression molding, resin transfer molding, wet lay-up processing, pultrusion and pre-preg processing. FIG. 2A shows an example of a process of molding the resin with functionalized particles. This comprises an example for ease of understanding and does not limit any embodiments to any particular type of molding.

FIG. 2A shows a process according to a first embodiment. The recycled FRPs are put into some sort of grinder, shredder, or both 20, to take the FRP materials and product particles. These particles are then functionalized either separately or in concert with dispersal into the base resin at 22.

A dispensing head 26 dispenses defined volumes of the liquid resin 20 into either a single layer or a stack 28 of multiple layers of carbon fiber mats 24 to form a near uniform film at the top layer. The carbon fibers mats may consist of carbon fiber weaves, uniaxially oriented or biaxially oriented fiber mats. In building stacks of oriented fiber mats, the relative orientation of the mats between each stack may be set depending on the intended mechanical properties of the resulting part.

A goal is to dispense a well-defined amount of liquid resin that covers nearly the full lateral area of the mat to minimize the need to spread the resin significantly during the compression-molding step. This may be done by single point dispensing in the middle of the fiber mats, applicable in the case of low viscosity resins, as is currently done, or by extruding the resin through a slotted die 26 for applying the uniform volume over a larger area, applicable for both low to high viscosity resins. The resulting resin films may have thicknesses as low as 100 microns but are likely thicker (1-10 millimeters) since they contain enough resin volume to completely infiltrate the part, resulting in a final volume fraction of approximately 20-60% resin. It is anticipated that the resin will be mostly contained on top of the first fabric layer although some level of infiltration may occur if the fabric meshes are larger and the resin has low enough viscosity.

Since the enhanced resin contain fillers, recycled CFRP particles with sizes ranging from the multimicron to nanometers range, it is anticipated that it will be more viscous than commonly used un-filled resins which can be dispensed easily given their low viscosities, typically 100 centi-Poise or lower. The enhanced resins may have viscosities larger than this, at least larger than 100 centi-Poise, and require a larger pressure drop for fast extrusion of the correct volumes. Such hardware for dispensing fluid may include air-pressure driven fluid systems with pressure multipliers, hydraulic piston-based force multipliers or screw and barrel-type extruder systems that can shear thin the resin prior to dispensing. These may include other hardware elements known to those skilled in the art.

In the likely application, a single layer of resin with the correct volume will be dispensed atop the single carbon fiber (CF) mat or a stack of several CF mats. Other variations to this may include extruding multiple resin layers atop the single CF mat or the stack of several CF mats to obtain the right resin volume. One may also choose to extrude a resin volume on top of each CF mat before composing them into a stack to reduce the resin infiltration time through the mat. One other way could be to put the resin in the middle of the stack of CF mats, sandwiched between two mat layers, to enhance its penetration.

After the dispensing step, the now wet CF mat or wet stack of CF mats will be placed in the lower half 32 of the compression mold for a high-temperature compression molding used in conjunction with the upper half 30. The mat placement maybe manual or, in the foreseen application, automated to minimize the required time for placement. In the compression molding, the two halves of the molds will be closed to form a near closed volume around the wet CF mat or wet stack of CF mats to shape the assembly into the desired part geometry. The mold tooling will be pre-heated to sufficiently high temperatures to minimize the time required to fully heat the part to the curing temperature of the base resin.

The mold supplies sufficient hydrostatic pressure to force the resin infiltration through the CF mat/s. This can be achieved by known methods in the art in designing the right mold geometry and by applying the right pressure during compression. This process will lead to the formation of a fully cured or nearly-fully cured solid CFRP part with the desired geometry, where the resin has fully infiltrated the CF mat layers and with little no voids in the resin to produce a part 34. In the target application, the process will also yield a class A surface that has adequate aesthetic value for commercial automotive applications with minimal post-processing.

In some applications, the mold halves 30 and 32 would have a seal and pump valve to generate vacuum within the chamber for better void control of the CFRP part.

As can be seen in FIG. 2B, an exploded view of the class A surface includes the CFRP particles such as 36 in the resin. Because the CFRP particles are functionalized with reactive groups that can react with the base epoxy, they are expected to covalently link to the resulting thermoset network that is also chemically-linked to the carbon fibers. The existence of this chemically-linked percolating covalent network is responsible for the mechanical property gains when using the proposed resin. It is intended that these CFRP particles are well-dispersed throughout the resin, as shown in 36, and in some instances may also show alignment or orientation with respect to the CF surface. This relative alignment maybe desirable and can contribute to the increase in mechanical properties.

It is anticipated that the combination of the two processes of dispensing and compression molding can be done with cycle times of lower than 3 minutes. Possible modifications, such as longer hold time in the mold, may increase this cycle time but could also lead to better performing parts. The proposed resin system may also be used for other CFRP processing methods that might have similar or longer cycle times but may afford advantages in other properties. For example, the enhanced resin of the embodiments may also be used in a resin transfer molding process where the dry fiber mats are placed in the mold of the desired geometry and the resin dispensing is done in the mold, such as through one or more sprues.

In the case of RTM (resin transfer molding), the resin transfer time may have the largest impact on the cycle time. The resin transfer time means the time required for resin to spread around the mold and across the part and through the interstices of the mat/s. This may take from 30 to 60 minutes depending on the resin viscosity and part size and geometry. Methods for high pressure-RTM are also known in the art and may lead to shorter cycle times, such as between 1-10 minutes, and require higher pressure dispensing systems such as those mentioned in the dispensing step for wet compression molding and otherwise known in the art. The proposed liquid resin system may also be used for pre-preg type approaches where pre-pregs of resin-infiltrated stacks of CF mat/s are laid up into molding systems are formed at high temperature to shape the pre-preg into the desired part geometry.

In the pre-preg case, the enhanced resin system containing particles will be used in the fabrication of the pre-preg. Methods for producing these may include soaking of the fiber mats in vats of the liquid resin and a wet drawing process to pull the fiber mats out of the vat after the necessary holding conditions temperature. The methods may include holding time for resin infiltration, slot coating dispensing on resin volumes onto the fiber mats, spray application of the resins over the CF mats or pultrusion-type processes without the final curing and/or solidification. The resulting pre-preg maybe wet, semi-wet or semi-solid depending on the non-curing solidification process of the parent epoxy. In either the pre-preg case or the flat mat instances, the resin having the particles is dispensed into the mat, referred to here as a resin mat.

The choice of pre-preg fabrication process may have advantages depending on the actual properties of the enhanced resin system. Wet drawing or pultrusion-type processes are common, established processes in pre-preg manufacturing but do not offer tight control over the resin composition considering the fraction of dispersed fillers. However, these processes may work for resins of nearly any viscosity. Slot coating and spray-type applications of the resin into the CF mat/s afford better control over the resin composition but maybe viscosity limited and might not work for resins of very high viscosity.

Irrespective to the manufacturing process, after removal from the mold, the part may be subjected to additional heating which may be beneficial because it will complete the curing of the part in the case the cure in the mold was incomplete. This will provide CFRP parts with improved properties when compared with partially cured or just low temperature cured compositions. Additional heating after demolding can be performed at lower, the same, or higher temperature than the molding temperature. The post curing time can range from <1 minute to up to 24 hours depending on materials and on the target mechanical performance.

As specified, the use of the CFRP particle enhanced resin increases the mechanical properties of the CFRP, including the elastic modulus, tensile strength, elongation and other properties. The improvement can be of at least 1% when compared with the CFRP made with the same resin base material but without the incorporated functionalized recycled CFRP particles. In other cases, it can be of at least 10% or 25% or higher. In other embodiments that use other FRPs (Kevlar, glass, etc.) as resin fillers, similar improvements can be expected in the final resulting FRP mechanical properties, depending on the degree of functionalization of FRP resin filler and its loading in the final FRP part.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art.

What is claimed is:

1. A method of recycling fiber reinforced polymers, comprising:
   grinding used fiber reinforced polymer material to produce ground particles;
   functionalizing the ground particles to produce functionalized particles, wherein functionalizing the ground particles comprises an indirect process involving generating a functional group onto cured epoxy resin and reacting the functional group with a reagent;
   dispersing the functionalized particles into a base resin;
   dispensing the resin with functionalized particles into one or more layers of continuous fiber mats;
   molding the resin with functionalized particles and the continuous fiber mats into a form of a desired part; and
   curing the form to produce the part.

2. The method as claimed in claim 1, wherein grinding the used fiber reinforced polymer material comprises grinding at least one material from the group consisting of: ground fiber composite particles including at least one of continuous, discontinuous, and powder fiber; polymer fiber reinforced particles; carbon fiber reinforced polymers; carbon composite particles; heat-resistant synthetic light-weight fiber; ceramic fiber composite particles; and glass fiber reinforced particles.

3. The method as claimed in claim 1, wherein the continuous fiber mats is selected from the group consisting of: continuous carbon fiber; glass fiber; silicon carbide, aluminum oxide, and heat-resistant synthetic light-weight fiber fiber mats.

4. The method as claimed in claim 1, wherein the indirect process comprises acidic cleavage.

5. The method as claimed in claim 1, wherein grinding comprises one selected from the group consisting of: grinding; ball milling; and high power planetary ball milling.

6. The method as claimed in claim 1, wherein providing the ground particles comprises providing ground particles having a size in the range of 10 nm to 10 mm.

7. The method as claimed in claim 1, wherein dispersing the functionalized particles comprises one selected from the group consisting of: shear mixing; centrifuge mixing; rheometer mixing; cutting and folding; compressive mixing; flow mixing; and sonication dispersion.

8. The method as claimed in claim 1, wherein the resin comprises one of the group consisting of: epoxy resins having glass transition temperatures of at least 150° C.; resins having more than 2 functional groups per molecule; resins having 8 functional groups per molecule; and novolac resins.

9. The method as claimed in claim 1, wherein the resin includes a fast curing agent comprising at least one of amino hardeners, a latent curing agent, or a catalyst.

10. The method as claimed in claim 1, wherein dispensing the resin with functionalized particles into one or more layers of continuous fiber mats forms a pre-preg mat.

11. The method as claimed in claim 1, wherein molding comprises one of the group consisting of: wet compression molding, resin transfer molding, wet lay-up processing, pultrusion and pre-preg processing.

12. A method of recycling fiber reinforced polymers, comprising:
   grinding used fiber reinforced polymer material to produce ground particles;
   functionalizing the ground particles to produce functionalized particles, wherein functionalizing the ground particles comprises a direct process of one of either transformation of chemical groups into cured epoxy, or transformation of chemical groups into new epoxy groups using reagents;
   dispersing the functionalized particles into a base resin;
   dispensing the resin with functionalized particles into one or more layers of continuous fiber mats;
   molding the resin with functionalized particles and the continuous fiber mats into a form of a desired part; and
   curing the form to produce the part.

13. The method as claimed in claim 12, wherein grinding the used fiber reinforced polymer material comprises grinding at least one material from the group consisting of: ground fiber composite particles including at least one of continuous, discontinuous, and powder fiber; polymer fiber reinforced particles; carbon fiber reinforced polymers; carbon composite particles; heat-resistant synthetic light-weight fiber; ceramic fiber composite particles; and glass fiber reinforced particles.

14. The method as claimed in claim 12, wherein the continuous fiber mats is selected from the group consisting of: continuous carbon fiber; glass fiber; silicon carbide, aluminum oxide, and heat-resistant synthetic light-weight fiber mats.

15. The method as claimed in claim 12, wherein grinding comprises one selected from the group consisting of: grinding; ball milling; and high power planetary ball milling.

16. The method as claimed in claim 12, wherein dispersing the functionalized particles comprises one selected from the group consisting of: shear mixing; centrifuge mixing; rheometer mixing; cutting and folding; compressive mixing; flow mixing; and sonication dispersion.

17. The method as claimed in claim 12, wherein the resin comprises one of the group consisting of: epoxy resins having glass transition temperatures of at least 150° C.; resins having more than 2 functional groups per molecule; resins having 8 functional groups per molecule; and novolac resins.

18. The method as claimed in claim 12, wherein the resin includes a fast curing agent comprising at least one of amino hardeners, a latent curing agent, or a catalyst.

19. The method as claimed in claim 12, wherein dispensing the resin with functionalized particles into one or more layers of continuous fiber mats forms a pre-preg mat.

20. The method as claimed in claim 12, wherein molding comprises one of the group consisting of: wet compression molding, resin transfer molding, wet lay-up processing, pultrusion and pre-preg processing.

\* \* \* \* \*